US006602315B2

(12) United States Patent
Hendrickson et al.

(10) Patent No.: US 6,602,315 B2
(45) Date of Patent: Aug. 5, 2003

(54) METALLURGICAL COMPOSITIONS CONTAINING BINDING AGENT/LUBRICANT AND PROCESS FOR PREPARING SAME

(75) Inventors: William Hendrickson, Stillwater, MN (US); Sydney Luk, Lafayette Hill, PA (US)

(73) Assignees: Hoeganaes Corporation, Riverton, NJ (US); Ameka, Inc., Woodbury, MN (US)

( * ) Notice: Subject to any disclaimer, the term of this patent is extended or adjusted under 35 U.S.C. 154(b) by 0 days.

(21) Appl. No.: 09/910,397

(22) Filed: Jul. 20, 2001

(65) Prior Publication Data

US 2002/0004540 A1 Jan. 10, 2002

Related U.S. Application Data

(60) Division of application No. 09/425,599, filed on Oct. 22, 1999, now Pat. No. 6,280,683, which is a continuation-in-part of application No. 08/955,382, filed on Oct. 21, 1997, now abandoned.

(51) Int. Cl.$^7$ ................................. C22C 1/05
(52) U.S. Cl. ..................... 75/255; 75/252; 428/461; 428/167
(58) Field of Search ................. 75/252; 428/461, 428/467

(56) References Cited

U.S. PATENT DOCUMENTS

| | | | |
|---|---|---|---|
| 101,869 A | 4/1870 | Gwynn | |
| 2,097,671 A | 11/1937 | Koehring | 75/22 |
| 2,415,036 A | 1/1947 | Quinn | 201/76 |
| 2,648,609 A | 8/1953 | Wurster | 99/166 |
| 3,117,027 A | 1/1964 | Lindlof et al. | 118/303 |
| 3,253,944 A | 5/1966 | Wurster | 99/166 |
| 3,453,105 A | 7/1969 | Flaks et al. | 75/213 |
| 3,691,130 A | 9/1972 | Logvinenko | 260/41 B |
| 3,929,476 A | 12/1975 | Kirby, Jr. et al. | 75/214 |
| 3,961,106 A | 6/1976 | Heytmeijer et al. | 427/221 |
| 3,993,838 A | 11/1976 | Heytmeijer et al. | 428/403 |
| 4,233,387 A | 11/1980 | Mammino et al. | 430/137 |
| 4,282,174 A | 8/1981 | Chase et al. | 264/111 |
| 4,478,790 A | 10/1984 | Hüther et al. | 419/54 |
| 4,483,905 A | 11/1984 | Engstrom | 428/570 |
| 4,608,317 A | 8/1986 | Kobayashi et al. | 428/546 |
| 4,675,140 A | 6/1987 | Sparks et al. | 264/4.3 |
| 4,676,831 A | 6/1987 | Engstrom | 75/252 |
| 4,731,195 A | 3/1988 | Olson | 252/174.13 |
| 4,774,139 A | 9/1988 | Hapelt et al. | 428/407 |
| 4,834,800 A | 5/1989 | Semel | 106/403 |
| 4,885,175 A | 12/1989 | Zibell | 426/5 |
| 4,946,499 A | 8/1990 | Sakuranda et al. | 75/343 |
| 4,994,326 A | 2/1991 | Shimmura et al. | 428/405 |
| 5,009,841 A | 4/1991 | Bloemacher et al. | 419/23 |
| 5,055,128 A | 10/1991 | Kiyota et al. | 75/246 |
| 5,069,714 A | 12/1991 | Gosselin | 75/252 |
| 5,085,930 A | 2/1992 | Widmann et al. | 428/323 |
| 5,108,493 A | 4/1992 | Causton | 75/255 |
| 5,135,566 A * | 8/1992 | Sakuranda et al. | 75/255 |
| 5,147,601 A | 9/1992 | Ohtsuka et al. | 419/25 |
| 5,147,722 A | 9/1992 | Koslow | 428/402 |
| 5,154,881 A | 10/1992 | Rutz et al. | 419/37 |
| 5,236,649 A | 8/1993 | Hall et al. | 264/130 |
| 5,256,185 A * | 10/1993 | Semel et al. | 75/255 |
| 5,262,240 A | 11/1993 | Dunning et al. | 428/404 |
| 5,290,336 A | 3/1994 | Luk | 75/231 |
| 5,298,055 A | 3/1994 | Semel et al. | 75/252 |
| 5,368,630 A | 11/1994 | Luk | 75/252 |
| 5,429,792 A | 7/1995 | Luk | 419/36 |
| 5,432,223 A * | 7/1995 | Champagne et al. | 524/431 |
| 5,484,469 A * | 1/1996 | Rutz et al. | 75/252 |
| 5,498,276 A | 3/1996 | Luk | 75/252 |
| 5,554,338 A | 9/1996 | Sugihara et al. | 419/5 |
| 5,603,987 A | 2/1997 | Lisenko | 427/221 |
| 5,624,631 A * | 4/1997 | Luk | 419/23 |
| 5,782,954 A * | 7/1998 | Luk | 75/252 |
| 5,926,686 A * | 7/1999 | Engstrom et al. | 419/37 |
| 5,989,304 A * | 11/1999 | Ozaki et al. | 75/252 |
| 6,068,813 A * | 5/2000 | Semel | 419/66 |
| 6,346,133 B1 * | 2/2002 | Narasimhan et al. | 75/252 |
| 6,364,927 B1 * | 4/2002 | Narasimhan et al. | 75/252 |
| 6,375,709 B1 * | 4/2002 | Storstrom et al. | 75/252 |
| 6,485,677 B1 * | 11/2002 | Johansson et al. | 419/38 |
| 2002/0004540 A1 * | 1/2002 | Hendrickson et al. | 523/205 |
| 2002/0073803 A1 * | 6/2002 | Narasimhan et al. | 75/252 |

FOREIGN PATENT DOCUMENTS

JP   1-294783   11/1989

\* cited by examiner

*Primary Examiner*—David W. Wu
*Assistant Examiner*—Rip A. Lee
(74) *Attorney, Agent, or Firm*—Woodcock Washburn LLP

(57) ABSTRACT

Improved methods for coating particulate materials at low shear conditions and preferably below the melting point of the coating material are provided. In one aspect, metallurgical compositions are provided that contain a metal-based powder bound to an alloying powder or powders by way of a low melting polymer or wax binding agent, which is preferably polyethylene. The binding agent is blended with the metal-based and alloying powders at elevated temperatures preferably below the melting point of the binding agent. The bonded metallurgical composition can be used in compaction processes to manufacture compacted parts that can be sintered to impart strength.

8 Claims, No Drawings

METALLURGICAL COMPOSITIONS CONTAINING BINDING AGENT/ LUBRICANT AND PROCESS FOR PREPARING SAME

This application is a divisional of Ser. No. 09/425,599 filed Oct. 22, 1999 now U.S. Pat. No. 6,280,683, which is a continuation in part of application Ser. No. 08/955,382, filed on Oct. 21, 1997, now abandoned.

FIELD OF THE INVENTION

This process relates to a coating process and compositions prepared by this process. The invention specifically relates to iron-based, metallurgical compositions, and more particularly, to metallurgical compositions that contain a binding agent that also provides lubrication during the compaction process used to form a part.

BACKGROUND OF THE INVENTION

Coating of particles is an important process for modifying particles and the surface properties of the particles. Methods for particle coating include the Wurster process as described in U.S. Pat. Nos. 2,648,609; 3,117,027; and 3,253,944 and more recently in U.S. Pat. Nos. 4,731,195 and 5,085,930 in which particles are fluidized in some manner and the fluidized particles are then spray coated with coating materials dissolved in various solvents or the coating materials are sprayed onto the core particles as a low viscosity melt; spray coating is also done in which the particles and the coating material is passed through a suitable atomizer. One example of this method is shown in U.S. Pat. No. 4,675,140 in which the coating material is a melted polymer. An interesting method is presented in U.S. Pat. No. 5,262,240 in which the coating is effected by mixing the particles with a latex and drying the resulting mixture. In this process a coated aggregate is produced. Well known methods for the coating of particles with thin organic layers can use a surface active agent such as organosilanes or fluorocarbons to modify the surface properties. In this method the particles are soaked in a solution and the surface active agent reacts with the particle. U.S. Pat. No. 4,994,326 is one example of such a process and the materials resulting form the treatment. Finally, a preferred method for particle coating is tumble blending or high shear hot blending. A number of patents describe this process. U.S. Pat. No. 4,233,387 describes a process wherein electrophotographic carriers are treated with thermoplastic resins about 325° F. The resulting mixture is then cooled, ground, to an appropriate size and used to charge toners in a photocopier. U.S. Pat. No. 4,774,139 describes a process for coating paraffin onto thermoplastic hot melt resin. U.S. Pat. No. 4,885,175 describes a method for coating a sweetener with a molten wax, cooling the mixture, and grinding the cooled mass to the desired size. Finally, as an example in this hot melt blending process U.S. Pat. No. 4,1356,566 describes the coating of iron powders with a polymer and additives by mixing the ingredients in a high shear mixer at temperatures above the melting point of the polymer coating material.

In all the above cases the processes are lacking in a number of important aspects. In the Wurster-like processes, the methods all involve having a particle that is fluidizable. Typically, this is a particle with at least an average size of 50 microns. Further, in the Wurster-like process if solutions are used as the coating vehicle, the solvent, water or organic solvent, must be removed by drying. This is tedious for water solutions and dangerous for flammable liquids. In direct atomization methods there is the difficulty of separation of the coated and uncoated particles. While U.S. Pat. No. 4,675,140 describes a method for particle separation, this technique is not universally applicable to all materials. There are two problems that hinder the application of hot blending methods, in which the processing temperature is above the melting point. First, the agglomeration is an undesired side effect for this process. For many applications subsequent grinding and classification processing can be difficult or too expensive. Secondly, operation of the process above the melting point does result in higher energy costs, which is always undesirable. U.S. Pat. No. 5,147,722 teaches a method in which coating of the particles can be done below the melting point of the polymer binder. Under the conditions of this process with high shear mixing and high applied pressure, the particles are coated, but a web-like matrix is formed. However, for various compositions agglomeration is not desired and the use of high shear mixers and high pressure adds extra capital and operating cost. U.S. Pat. No. 5,236,649 also teaches that particle coating can be done at a temperature lower than the melting point of the coating material. However, as in U.S. Pat. No. 5,147,722, the process requires high shear mixing to obtain a good coating.

The use of coated particles has use in decorative masonry, proponents for oil wells, taste masking in the food and pharmaceutical industries and in the powder metallurgy industry. The powder metallurgy industry has developed metal-based powder compositions, generally iron-based powders, that can be processed into integral metal parts having various shapes and sizes for uses in various industries, including the automotive and electronics industries. One processing technique for producing the parts from the base powders is to charge the powder into a die cavity and compact the powder under high pressures. The resultant green compact is then removed from the die cavity and sintered to form the final part.

Industrial usage of metal parts manufactured by the compaction and sintering of metal powder compositions is expanding rapidly into a multitude of areas. Manufacture of these parts with metal powder compositions provides substantial benefits in comparison to having to use a molten alloy in the manufacturing process. For instance, the metal powder compositions allow for the manufacturing process to proceed with just a high pressure compaction die machine and a sintering oven. The different parts are made by simply replacing the compaction die. Further, there is no need to handle molten alloys.

In the manufacture of such parts, iron or steel particulate powders are often admixed with at least one other alloying element that is also in particulate form. These alloying elements permit the attainment of higher strength and other mechanical properties in the final sintered part. The alloying elements typically differ from the base iron or steel powders in particle size, shape and density. For example, the average particle size of the iron-based powders is typically about 70–100 microns, or more, while the average particle size of most alloying ingredients is less than about 20 microns, more often less than about 15 microns, and in some cases less than about 5 microns. The alloying powders are purposely used in such a finely-divided state to promote rapid homogenization of the alloy ingredients by solid-state diffusion during the sintering operation.

The presence of the different particle size materials leads to problems such as segregation and dusting upon transportation, storage and use. The iron and alloy element powders are initially blended into a homogeneous powder.

The dynamics of handling the powder mixture during storage and transfer cause the smaller alloying powder particles to migrate through the interstices of the iron-based powder matrix, resulting in a loss of homogeneity of the mixture, or segregation. On the other hand, air currents that can develop within the powder matrix as a result of handling can cause the smaller alloying powders, particularly if they are less dense than the iron powders, to migrate upwardly. If these buoyant forces are high enough, some of the alloying particles can, in the phenomenon known as dusting, escape the mixture entirely, resulting in a decrease in the concentration of the alloy element.

Various organic binding agents have been used to bind or "glue" the finer alloying powder to the coarser iron-based particles to prevent segregation and dusting for powders to be compacted at ambient temperatures. For example, U.S. Pat. No. 4,483,905 to Engström teaches the use of a binding agent that is broadly described as being of "a sticky or fat character" in an amount up to about 1% by weight of the powder composition. U.S. Pat. No. 4,676,831 to Engström discloses the use of certain tall oils as binding agents. Also, U.S. Pat. No. 4,834,800 to Semel discloses the use of certain film-forming polymeric resins that are insoluble or substantially insoluble in water as binding agents.

Various other types of binding agents are set forth in the patent literature. Polyalkylene oxides having molecular weights of at least about 7000 are disclosed as binding agents in U.S. Pat. No. 5,298,055. Combinations of dibasic organic acid and one or more additional components such as solid polyethers, liquid polyethers, and acrylic resins as binding agents are disclosed in U.S. Pat. No. 5,290,336. Binding agents that can be used with high temperature compaction lubricants are disclosed in U.S. Pat. No. 5,368,630.

U.S. Pat. No. 5,480,469 ("469 patent") provides a brief review of the use of binding agents in the powder metallurgy industry. The 469 patent notes that it is important to have not only a powder composition that has the alloying powder adhered to the iron-based powder by way of the binding agent, but to also have a lubricant present to achieve adequate compressibility of the powder composition within the die and to decrease the forces required to remove the part from the die. The 469 patent discusses various references that disclose the use of a binding agent in conjunction with a lubricant powder, such as a metal soap, to be blended with the iron-based and alloying powders. This blend is then heated and mixed to melt the binding agent and the lubricant and to bind the alloy powder to the iron-based powder. This mixture is then cooled to form the final composition. The 469 patent discloses an improvement to this type of technology by using a diamide wax as the binding agent whereby a metal soap lubricant is not required.

The presence of a binding agent should not adversely affect the compressibility of the powder metallurgical composition. The "compressibility" of a powder blend is a measure of its performance under various conditions of compaction. In the art of powder metallurgy, a powder composition is generally compacted under great pressure in a die, and the compacted "green" part is then removed from the die and sintered. It is recognized in this art that the density, and usually the strength, of this green part vary directly with the compaction pressure. In terms of "compressibility", one powder composition is said to be more compressible than another if, at a given compaction pressure, it can be pressed to a higher green density, or alternatively, if it requires less compaction pressure to attain a specified green density. If the binding agent has good "internal" lubrication characteristics, it will enhance the compressibility of the powder composition and result in a higher green density at a given compaction pressure.

Therefore, a need exists for a coating process that can provide a simple and inexpensive method for coating a variety of particles. In the powder metallurgical industry a specific need exists for a metallurgical composition that contains the alloying powder(s) bonded to the metal-based powder where that composition can be prepared in a solventless process. The binding agent used in the metallurgical composition should function to decrease the amount of dusting and/or segregation of the alloying powder(s) and also not adversely effect the compressibility of the composition.

SUMMARY OF THE INVENTION

The present invention provides an improved method for particle coating that uses a low shear, low temperature method to produce non-agglomerated, coated particles. In one embodiment, the present invention provides improved powder metallurgical compositions containing a major amount of a metal-based powder bound to a minor amount of at least one alloying powder.

The particulate powders that can be coated in accordance with the present invention include metal powders such as iron, copper, nickel, cobalt, chromium, aluminum, zinc, silicon, manganese, silver, gold, platinum, palladium, titanium, their alloys and blends thereof; inorganic oxides such as alumina, silica, and titania; inorganic compounds such as common table salt, peroxide bleaches, bath salts, calcium chloride, and inorganic fertilizers such as potash; and solid organic compounds such polymers, acids and bases. The core particles can be in any-form such as beads, flakes, fibers, and acicular particles wherein at least one dimension, on a number average, is in the range of 10 microns to 1 cm, preferably in the range of 20 microns to 0.75 cm and most preferably in the range of 25–10,000 microns.

The coating material, referred to herein also as a binding agent or material, particularly with respect to powder metallurgy compositions, can be a low melting, solid polymer or wax, e.g., a polymer or wax having a softening temperature of below 200° C. (390° F.), preferably below 150° C. (300° F.), and more preferably between about 65–95° C. (150–250° F.). Examples of solid polymeric binding agents include polyesters, polyethylenes, epoxies, and urethanes. Examples of waxes include paraffins, ethylene bisstearamides, and cotton seed waxes. The solid binding agent can also be polyolefins with weight average molecular weights below 3,000, and hydrogenated vegetable oils that are $C_{14-24}$ alkyl moiety triglycerides and derivatives thereof, including hydrogenated derivatives, e.g. cottonseed oil, soybean oil, jojoba oil, and blends thereof. The solid coating material is preferably reduced to an average particle size in at least one dimension of less than 200 or 100 microns, and preferably in the range of between 0.01 and 50 microns, more preferably between 0.01 and 20 microns.

The coating process of the present invention can be a "dry" bonding process that does not require a solvent for the binding agent. The process used involves the mixing of a suitable binding agent in the preferred particle size range, with the core particles, and any alloying particles or any additives at ambient or elevated temperatures. The blend is then gently mixed using a conventional mixer under low shear conditions. The mixture is preferably heated to at least 120° F. (49° C.) and preferably to a temperature below the melting point of the binding agent, blended, and then cooled to provide the final product.

The powder metallurgy compositions of the present invention are prepared by mixing the metal-based powder with the alloying powder(s) at ambient or elevated temperatures and blending the binding agent with those powders either at ambient or elevated temperatures. During the blending process the binding agent is contacted with the metal-based and alloying powders at temperatures of at least about 120° F. (49° C.). This blended composition can then be cooled to ambient conditions. The temperature of the blending process is preferably conducted at a bulk powder temperature that is below the melting point of the binding agent.

The preferred binding agent for powder metallurgy applications is polyethylene wax. The polyethylene wax is preferably introduced into the mixture of the metal-based and alloying powders in its solid state. If introduced in its solid state, it can be used in various forms such as spheres, fibers, or flakes. Particularly advantageous results are obtained by using a polyethylene wax in the form of spheres having an average particle size of below about 50, and preferably below about 30, microns.

DETAILED DESCRIPTION OF THE INVENTION

The present invention relates to an improved process for the formation of coated particles, improved metallurgical powder compositions, methods for the preparation of those compositions, and methods for using those compositions to make compacted parts. The powder metallurgy compositions comprise a metal-based powder, preferably an iron-based metal powder, in admixture with at least one alloying powder, and a binding agent for adhering the alloying powder to the metal-based powder. The preferred binding agent for powder metallurgy applications is a polyethylene wax having a weight average molecular weight of below about 4000, more preferably below about 2000. It has been found that the use of the polyethylene wax as a binding agent for the metallurgical powder composition provides superior dusting/segregation resistance and also provides improved strength and ejection performance of the green compact.

The particles that can be coated in accordance with the present invention include metal powders such as iron, copper, nickel, cobalt, chromium, aluminum, zinc, silicon, manganese, silver, gold, platinum, palladium, titanium, their alloys and blends thereof; inorganic oxides such as alumina, silica, and titania; inorganic compounds such as common table salt, peroxide bleaches, bath salts, calcium chloride, and inorganic fertilizers such as potash; and solid organic compounds such polymers, acids and bases. The core particles can be in any form such as beads, flakes, fibers, and acicular parties wherein at least one dimension, on a number average, is in the range of 10 microns to 1 cm, preferably in the range of 20 microns to 0.75 cm and most preferably in the range of 25–10,000 microns.

The powder metallurgy compositions of the present invention comprise metal powders of the kind generally used in the powder metallurgy industry, such as iron-based powders and nickel-based powders. The metal powders constitute a major portion of the metallurgical powder composition, and generally constitute at least about 80 weight percent, preferably at least about 90 weight percent, and more preferably at least about 95 weight percent of the composition.

Examples of "iron-based" powders, as that term is used herein, are powders of substantially pure iron, powders of iron pre-alloyed with other elements (for example, steel-producing elements) that enhance the strength, hardenability, electromagnetic properties, or other desirable properties of the final product, and powders of iron to which such other elements have been diffusion bonded.

Substantially pure iron powders that can be used in the invention are powders of iron containing not more than about 1.0% by weight, preferably no more than about 0.5% by weight, of normal impurities. Examples of such highly compressible, metallurgical-grade iron powders are the ANCORSTEEL 1000 series of pure iron powders, e.g. 1000, 1000B, and 1000C, available from Hoeganaes Corporation, Riverton, N.J. For example, ANCORSTEEL 1000 iron powder, has a typical screen profile of about 22% by weight of the particles below a No. 325 sieve (U.S. series) and about 10% by weight of the particles larger than a No. 100 sieve with the remainder between these two sizes (trace amounts larger than No. 60 sieve). The ANCORSTEEL 1000 powder has an apparent density of from about 2.85–3.00 g/cm$^3$, typically 2.94 g/cm$^3$. Other iron powders that can be used in the invention are typical sponge iron powders, such as Hoeganaes' ANCOR MH-100 powder.

The iron-based powder can incorporate one or more alloying elements that enhance the mechanical or other properties of the final metal part. Such iron-based powders can be powders of iron, preferably substantially pure iron, that has been pre-alloyed with one or more such elements. The pre-alloyed powders can be prepared by making a melt of iron and the desired alloying elements, and then atomizing the melt, whereby the atomized droplets form the powder upon solidification.

Examples of alloying elements that can be pre-alloyed with the iron powder include, but are not limited to, molybdenum, manganese, magnesium, chromium, silicon, copper, nickel, gold, vanadium, columbium (niobium), graphite, phosphorus, aluminum, and combinations thereof. The amount of the alloying element or elements incorporated depends upon the properties desired in the final metal part. Pre-alloyed iron powders that incorporate such alloying elements are available from Hoeganaes Corp. as part of its ANCORSTEEL line of powders.

A further example of iron-based powders are diffusion-bonded iron-based powders which are particles of substantially pure iron that have a layer or coating of one or more other metals, such as steel-producing elements, diffused into their outer surfaces. Such commercially available powders include DISTALOY 4600A diffusion bonded powder from Hoeganaes Corporation, which contains about 1.8% nickel, about 0.55% molybdenum, and about 1.6% copper, and DISTALOY 4800A diffusion bonded powder from Hoeganaes Corporation, which contains about 4.05% nickel, about 0.55% molybdenum, and about 1.6% copper.

A preferred iron-based powder is of iron pre-alloyed with molybdenum (Mo). The powder is produced by atomizing a melt of substantially pure iron containing from about 0.5 to about 2.5 weight percent Mo. An example of such a powder is Hoeganaes' ANCORSTEEL 85HP steel powder, which contains about 0.85 weight percent Mo, less than about 0.4 weight percent, in total, of such other materials as manganese, chromium, silicon, copper, nickel, molybdenum or aluminum, and less than about 0.02 weight percent carbon. Another example of such a powder is Hoeganaes' ANCORSTEEL 4600V steel powder, which contains about 0.5–0.6 weight percent molybdenum, about 1.5–2.0 weight percent nickel, and about 0.1-.25 weight percent manganese, and less than about 0.02 weight percent carbon.

Another pre-alloyed iron-based powder that can be used in the invention is disclosed in U.S. Pat. No. 5,108,493, entitled "Steel Powder Admixture Having Distinct Pre-alloyed Powder of Iron Alloys," which is herein incorporated in its entirety. This steel powder composition is an admixture of two different pre-alloyed iron-based powders, one being a pre-alloy of iron with 0.5–2.5 weight percent molybdenum, the other being a pre-alloy of iron with carbon and with at least about 25 weight percent of a transition element component, wherein this component comprises at least one element selected from the group consisting of chromium, manganese, vanadium, and columbium. The admixture is in proportions that provide at least about 0.05 weight percent of the transition element component to the steel powder composition. An example of such a powder is commercially available as Hoeganaes' ANCORSTEEL 41 AB steel powder, which contains about 0.85 weight percent molybdenum, about 1 weight percent nickel, about 0.9 weight percent manganese, about 0.75 weight percent chromium, and about 0.5 weight percent carbon.

Other iron-based powders that are useful in the practice of the invention are ferromagnetic powders. An example is a powder of iron pre-alloyed with small amounts of phosphorus.

The iron-based powders that are useful in the practice of the invention also include stainless steel powders. These stainless steel powders are commercially available in various grades in the Hoeganaes ANCOR® series, such as the ANCOR® 303L, 304L, 316L, 410L, 430L, 434L, and 409Cb powders.

The particles of iron or pre-alloyed iron can have a weight average particle size as small as one micron or below, or up to about 850–1,000 microns, but generally the particles will have a weight average particle size in the range of about 10–500 microns. Preferred are iron or pre-alloyed iron particles having a maximum weight average particle size up to about 350 microns; more preferably the particles will have a weight average particle size in the range of about 25–150 microns, and most preferably 80–150 microns.

The metal powder used in the present invention can also include nickel-based powders. Examples of "nickel-based" powders, as that term is used herein, are powders of substantially pure nickel, and powders of nickel pre-alloyed with other elements that enhance the strength, hardenability, electromagnetic properties, or other desirable properties of the final product. The nickel-based powders can be admixed with any of the alloying powders mentioned previously with respect to the iron-based powders. Examples of nickel-based powders include those commercially available as the Hoeganaes ANCORSPRAY® powders such as the N-70/30 Cu, N-80/20, and N-20 powders.

The metal-based powder can also include any combination of the described metal-based powders.

The metallurgical powder compositions of the present invention also include a minor amount of at least one alloying powder. As used herein, "alloying powders" refers to materials that are capable of alloying with the metal-based powder upon sintering. The alloying powders that can be admixed with metal-based powders of the kind described above are those known in the metallurgical arts to enhance the strength, hardenability, electromagnetic properties, or other desirable properties of the final sintered product. Steel-producing elements are among the best known of these materials. Specific examples of alloying materials include, but are not limited to, elemental molybdenum, manganese, chromium, silicon, copper, nickel, tin, vanadium, columbium (niobium), metallurgical carbon (graphite), phosphorus, aluminum, sulfur, and combinations thereof. Other suitable alloying materials are binary alloys of copper with tin or phosphorus; ferro-alloys of manganese, chromium, boron, phosphorus, or silicon; low-melting ternary and quaternary eutectics of carbon and two or three of iron, vanadium, manganese, chromium, and molybdenum; carbides of tungsten or silicon; silicon nitride; and sulfides of manganese or molybdenum.

The alloying powders are in the form of particles that are generally of finer size than the particles of metal powder with which they are admixed. The alloying particles generally have a weight average particle size below about 100 microns, preferably below about 75 microns, more preferably below about 30 microns, and most preferably in the range of about 5–20 microns. The amount of alloying powder present in the composition will depend on the properties desired of the final sintered part. Generally the amount will be minor, up to about 5% by weight of the total powder composition weight, although as much as 10–15% by weight can be present for certain specialized powders. A preferred range suitable for most applications is about 0.25–4.0% by weight of the total powder composition.

The binding agent of the present invention can include solid, low melting polymers or waxes having a softening temperature below about 200° C. (390° F.), preferably below about 150° C. (300° F.), more preferably between about 50°–110° C. (125–225° F.), and even more preferably between 65°–95° C. (150°–200° F.). Examples of polymeric binding agents include polyesters, polyethylenes, epoxies, and urethanes. Examples of waxes include paraffins, ethylene bisstearamide (ACRAWAX), and cotton seed wax. The binding agent can also include solid polyolefins with weight average molecular weights below 3,000, and solid hydrogenated vegetable oils that can generally be described as triglycerides having $C_{14-24}$ side chains, and derivatives thereof, including hydrogenated derivatives, such as cotton seed oil, soybean oil, and jojoba oils, and blends thereof.

The binding agent is preferably reduced to an average particle size in at least one dimension of less than 200 microns, and preferably less than 100 microns, with a preferred range of between 0.01 and 50 microns and most preferably in the range of between 0.01 and 20 microns. Therefore, particles in the form of spheres, acicular beads, flakes, or fibers are preferred. Methods of preparing the binder material to get a small particle size includes grinding, crushing, spray drying, melt atomization, extrusion, shaving, and direct reaction. Most preferably melt atomization is used to prepare the binder material in the size ranges listed above. Additional additives can be added to the binding material as needed such as pigments, other metals, inorganic compounds such as salts, graphite, or carbon black, inorganic oxides such as aluminate, silica, and titania.

A preferred binding agent of the present invention particularly for powder metallurgy applications is a solid polyethylene wax having a weight average molecular weight of below about 4000, preferably about 2000 or below, and generally from about 100 to about 4000, and even more preferably from about 500 to about 2000. Suitable polyethylene waxes are commercially available from Petrolite Specialty Polymers Group as the Polywax series, such as Polywax 500 and Polywax 2000. The polyethylene wax preferably has a melt viscosity in the range of 1 to about 500 cps, more preferably between about 3 and 50 cps. The melting point of the polyethylene wax is preferably between 50° C. and 200° C., more preferably between 75° C. and 130° C.

A preferred average particle size for the binding agent, such as polyethylene wax, for powder metallurgy applications, is between about 1 and about 50, and even more preferably between about 1 to about 25, microns to aid in the contact between the binding agent with the iron and alloying powders during the blending process. Spherical particles having sizes above these ranges can be used, but it has been found that the temperature of the blending process should be increased in such cases to ensure adequate bonding. If the particulate binding agent is not spherical, at least one dimension of the particles is within the stated ranges for the spherical particles. The particle size of the binding agents can be determined by such methods as laser diffraction techniques. The particle size of the binding agents can be reduced to these ranges by spray atomization techniques commonly known in the industry.

The metallurgical powder composition can be prepared by various blending techniques. Common to all techniques is that the blending of the polymer or wax binding agent with the metal-based and alloying powders is conducted at a powder blend temperature of at least about 27° C., preferably at least about 50° C., generally in the range between about 50–190° C., more preferably between about 65–90° C.

In certain situations, and particularly when using the binding agent in the form of solid flakes or lower particle size spheres, it is preferred to blend the binding agent with the metal-based and alloying powders at a temperature below the melting point of the binding agent to improve the properties of the green compact and to limit the ejection forces required to remove the compact from the die cavity. Thus, in certain situations, it is preferred to blend the solid binding agent with the metal-based and alloying powders at a temperature between about 3–35 Celsius degrees, preferably between about 5–30 Celsius degrees, and more preferably between about 8–25 Celsius degrees, below the melting point of the binding agent. For instance, it has been found that beneficial properties are obtained when using polyethylene having a melting point of about 88° C., a $M_w$ of about 500, and a weight average particle size of about 20 $\mu$m to blend the polyethylene material with the metal-based and alloying powders at a temperature of about 65° C.

The metal-based powder can be initially blended with the alloying powder(s) to form a homogeneous mixture at ambient conditions or at the elevated blending temperature. The binding agent, either partially or fully pre-heated, can then be blended with the metal-based and alloying powders in an appropriate vessel in which the temperature of the powder blend can be maintained at the desired level for a time sufficient to contact a substantial, if not entire, portion of the metal-based and alloying powders. The blending of the binding agent is preferably continued until there is obtained a homogeneous mixture. Alternatively, the binding agent can be mixed with the metal-based and alloying powders at the onset, and this mixture can then be heated to the appropriate chosen blending temperature and mixing is conducted at that temperature or temperature range until there is obtained a homogeneous blend. In either process, the blended composition is then cooled to ambient temperature with optional intermittent or continuous mixing.

The concentration of the binding agent in the metallurgical composition (containing the metal-based and alloying powders along with other lubricants, etc.) is in the range of from about 0.05 to about 2, preferably from about 0.25 to about 1.5, and more preferably from about 0.5 to about 1, percent by weight. Concentrations of the binding agent below these levels do not result in effective bonding between the alloying powder and the metal-based powder, and concentrations above these levels generally result in poorer green density and strength properties.

Following the blending of the binding agent into the metallurgical composition, and preferably after that composition has been cooled to an extent, typically to at least below the melting point of the binding agent, and preferably below about 65° C., more preferably below about 50° C. and more preferably below about 40° C., and commonly when the composition is at room temperature, a conventional lubricant can optionally be added and mixed until a homogeneous composition is obtained. The amount of lubricant added can range from about 0.01 to about 2, preferably from about 0.05 to about 1 percent by weight of the final metallurgical composition. Typical lubricants include stearate compounds, such as lithium, zinc, manganese, and calcium stearates commercially available from Witco Corp.; waxes such as ethylene bis-stearamides and polyolefins commercially available from Shamrock Technologies, Inc.; mixtures of zinc and lithium stearates commercially available from Alcan Powders & Pigments as Ferrolube M, and mixtures of ethylene bis-stearamides with metal stearates such as Witco ZB-90. metal stearates and synthetic waxes such as "ACRAWAX" or "PM 100" available from Glyco Chemical Company.

The metallurgical powder compositions as described above can then be compacted in a die to form a metal part in accordance with conventional practices. The resulting green compact can then be sintered in accordance with conventional practices.

EXAMPLES

The following examples, which are not intended to be limiting, present certain embodiments and advantages of the present invention. Unless otherwise indicated, any percentages are on a weight basis.

In each of the examples (except the CONTROL composition in Example 1), the metallurgical compositions were prepared by first mixing the iron-based powder (ANCORSTEEL 1000B from Hoeganaes Corporation) with the alloying powders, and subsequently heating this mixture to a temperature of about 200° F. (93° C.). This heated mixture was then charged to a mixing vessel heated to the test temperature and mixing was conducted until the composition reached the test temperature. The binding agent was then added to the mixing vessel and continuous mixing was conducted until a homogeneous blend was obtained. The blended composition was then cooled to ambient temperature with intermittent mixing to improve the cooling operation.

The alloying powders used were graphite powder (Asbury grade 3203) 2 to 6 $\mu$m and nickel powder (International Nickel Inc., grade INCO 123).

The compositions were then compacted into green bars in a die at a pressure of 50 tons per square inch (tsi) and at a die and powder temperature of about 145° F. (63° C.).

Physical properties of metallurgical compositions and of the green and sintered bars were determined generally in accordance with the following test methods and formulas:

| Property | Test Method |
|---|---|
| Apparent Density (g/cc) | ASTM B212-76 |
| Flow (sec/50 g) | ASTM B213-77 |

-continued

| Property | Test Method |
|---|---|
| Green Density (g/cc) | ASTM B331-76 |
| Green Strength (psi) | ASTM B312-76 |
| Green Expansion | |

$$\text{G.E. (\%)} = \frac{100\,[(\text{green bar length}) - (\text{die length})]}{\text{die length}}$$

Strip pressure measures the static friction that must be overcome to initiate ejection of a compacted part from a die. It was calculated as the quotient of the load needed to start the ejection over the cross-sectional area of the part that is in contact with the die surface, and is reported in units of psi.

Slide pressure is a measure of the kinetic friction that must be overcome to continue the ejection of the part from the die cavity; it is calculated as the quotient of the average load observed as the part traverses the distance from the point of compaction to the mouth of the die, divided by the surface area of the part, and is reported in units of psi.

The dust resistance of the test metallurgical compositions was determined using the test method set forth in U.S. Pat. No. 5,368,630, which is hereby incorporated in its entirety by reference. The mixtures were tested for dusting resistance by elutriating them with a controlled flow of nitrogen. The test apparatus consisted of a cylindrical glass tube vertically mounted on a two-liter Erlenmeyer flask equipped with a side port to receive the flow of nitrogen. The glass tube (17.5 cm in length, 2.5 cm inside diameter) was equipped with a 400 mesh screen plate positioned about 2.5 cm above the mouth of the flask. A sample of the mixture to be tested (20–25 grams) was placed on the screen plate and nitrogen was passed through the tube at the rate of two liters per minute for 15 minutes. At the conclusion of the test, the mixture was analyzed to determine the relative amount of alloying powder remaining in the mixture (expressed as a percentage of the before-test concentration of the alloying powder), which is a measure of the composition's resistance to the loss of the alloying powder through dusting and/or segregation.

Example 1

The following example illustrates that the temperature at which a polyethylene binding agent is applied to the metal-based and alloying powders is important to the effectiveness of the binding between the metal-based powder and the alloying powders.

In this example, the metallurgical composition was comprised of 96.25% ANCORSTEEL 1000B as the metal-based powder, along with 2% nickel powder and 1% graphite powder as alloying powders, in addition to 0.75% of Polywax 500, which is a polyethylene binding agent having a $M_n$ of about 500 and a melting point of 190° F. (88° C.). The Polywax 500 used for the testing had a weight average particle size of about 20 $\mu$m. This particle size distribution was obtained by taking the Polywax 500 product having an average particle size of 2 mm and spray atomizing the polymer.

The "Bonded" composition was prepared in accordance with the general example procedures set forth above where the blending temperature was 150° F. (65° C.) and the "Control" composition was prepared by blending the constituents of the composition together at room temperature. The apparent density of the Control sample was 3.03 g/cc and 2.83 g/cc for the Bonded sample; neither sample exhibited flow.

Table 1 shows the dust resistance or bonding efficiency of the polyethylene binding agent, the green properties of the compacts, and the values of the die ejection forces for the two compositions. The blending of the composition with the polyethylene binding agent at a temperature of about 150° F. (65° C.) resulted in a significant increase in the dust resistance of the composition and an increase in the green strength of the compact. The green density was also increased indicating that the polyethylene binding agent as applied at the higher blending temperature provided some internal lubrication for the composition during compaction.

TABLE 1

| | TEST COMPOSITIONS | |
|---|---|---|
| Green Properties | CONTROL | BONDED |
| Green Properties | | |
| Green density (g/cm³) | 7.15 | 7.20 |
| Green strength (psi) | 2609 | 3300 |
| Green Expansion (%) | 0.14 | 0.15 |
| Ejection Performance | | |
| Strip Pressure (psi) | 4100 | 3700 |
| Slide pressure (psi) | 1700 | 1400 |
| Dust Resistance | | |
| % C | 65.6 | 94.0 |
| % Ni | 24.7 | 67.6 |

Example 2

Various levels of the polyethylene binding agent used in Example 1 were used to effect dust resistance in several metallurgical compositions prepared by dry blending the binding agent with the metal-based and alloying powders in accordance with the general example procedures set forth above. The test compositions contained 2% nickel and 1% graphite as alloying powders. The compositions contained 0.5%, 0.75%, and 1% polyethylene (Polywax 500) with the balance of the composition being an iron-based powder, Hoeganaes' ANCORSTEEL 1000B. The test temperature for the blending step of the polyethylene with the rest of the powder metallurgy composition was 150° F. (65° C.). The apparent density of the samples was 2.92, 2.83, and 2.89, respectively for the 0.5%, 0.75%, and the 1% test samples; the samples did not exhibit flow.

Table 2 shows the dust resistance or bonding efficiency of the various levels of the polyethylene binding agent, the green properties of the compacts, and the values of the die ejection forces for the three compositions. The increase in the concentration of the polyethylene resulted in superior dust resistance and lower ejection forces, however the green density and strength was found to decease.

TABLE 2

| | TEST COMPOSITIONS | | |
|---|---|---|---|
| | 0.5% Binding Agent | 0.75% Binding Agent | 1.0% Binding Agent |
| Green Properties | | | |
| Green density (g/cm³) | 7.25 | 7.20 | 7.14 |
| Green strength (psi) | 3700 | 3300 | 3200 |
| Green Expansion (%) | 0.16 | 0.15 | 0.19 |

TABLE 2-continued

TEST COMPOSITIONS

|  | 0.5% Binding Agent | 0.75% Binding Agent | 1.0% Binding Agent |
|---|---|---|---|
| Ejection Performance |  |  |  |
| Strip Pressure (psi) | 4900 | 3700 | 3600 |
| Slide pressure (psi) | 1900 | 1400 | 1300 |
| Dust Resistance |  |  |  |
| % C | 90.0 | 94.0 | 98.0 |
| % Ni | 40.2 | 67.6 | 73.1 |

Example 3

The blending of the polyethylene binding agent with the iron-based and alloying powders was conducted at various temperatures using the binding agent described in Example 1. The test compositions contained 2% nickel and 1% graphite as the alloying powders in conjunction with 96.25% ANCORSTEEL 1000B iron-based powder along with 0.75% polyethylene. The tested blending temperatures for the bulk temperature of the mixed powder compositions were 100° F. (38° C.), 150° F. (65° C.), 170° F. (77° C.) and 220° F. (104° C.).

The test compositions blended at 150° F. and at 170° F. were prepared in accordance with the general procedures outlined above. The test composition blended at 100° F. was prepared by initially mixing the iron-based and alloying powders and blending in a vessel maintained at 100° F. with the subsequent addition of the polyethylene at a blending temperature of 100° F. The test composition blended at 220° F. was prepared by initially heating the iron-based and alloying powders to 200° F. and blending in a vessel maintained at 200° F. with the subsequent addition of the polyethylene at a blending temperature of 220° F. The apparent density of the samples was 2.88, 2.83, 2.90, and 2.92, respectively for the 100° F., 150° F., 170° F., and 220° F. test samples; the samples did not exhibit flow.

Table 3 shows the dust resistance or bonding efficiency at the various blending temperatures for the polyethylene the green properties of the compacts, and the values of the die ejection forces for the four compositions. The polyethylene was found not to effect bonding until a blending temperature of about 150° F. was reached. At higher blending temperatures the internal and external lubricity of the polyethylene was diminished resulting in decreased green densities and increased ejection pressures, respectively.

TABLE 3

|  | Test Compositions - Blending Temperature ||||
|---|---|---|---|---|
|  | 100° F. | 150° F. | 170° F. | 220° F. |
| Green Properties |  |  |  |  |
| Green density (g/cm³) | 7.16 | 7.20 | 7.18 | 7.17 |
| Green strength (psi) | 2900 | 3300 | 3100 | 3600 |
| Green Expansion (%) | 0.21 | 0.15 | 0.19 | 0.19 |
| Ejection Performance |  |  |  |  |
| Strip Pressure (psi) | 3800 | 3700 | 4100 | 4300 |
| Slide pressure (psi) | 1500 | 1400 | 1500 | 1500 |

TABLE 3-continued

|  | Test Compositions - Blending Temperature ||||
|---|---|---|---|---|
|  | 100° F. | 150° F. | 170° F. | 220° F. |
| Dust Resistance |  |  |  |  |
| % C | 47 | 94.0 | 98 | 98 |
| % Ni | 24 | 68 | 75 | 78 |

Example 4

Polywax 500 obtained from Petrolite is melted at 200° F. and atomized in a standard melt atomization system at 30 psi, 100 psi air pressure, and at a rate of 50 pounds per hour. The resulting 50 micron average particle size material is used as is without further screening or processing. 10 grams of the Polywax 500 binder was added to 100 g Tsumura bath salt (approximately 0.5 cm diameter) with 2.5 g copper phthalocyanine pigment from Clariant and blended in a 1 quart PK Blender at 150° F. for 30 minutes. After cooling, with tumbling the coated and colored product was removed from the blender. The salt was uniformly coated with good adhesion of the binder and pigment to the core salt particle. In another experiment a small bath salt, Tsumura Sea Pouri Salt Base, approximately 1000 microns diameter, was coated with 11 g Polywax 500 and 2.75 g copper phthalocyanine from Clariant with the same conditions as listed above with similar coating and adhesion results.

Example 5

Using the Polywax 500 as prepared in Example 4 glass beads were coated with various pigments. The glass beads, Glass Spheres-Series A, were obtained from Potters Industries, Carlstadt N.J. and are approximately 1000 microns in diameter. The procedure for coating for three pigments, Dianisidine Orange 2915 from Engelhard Cleveland, Ohio, Titania MT-100-HD from Daicolor-Pope Clifton, N.J., or copper phthalocyanine from Clariant and was to add 681 g of glass beads, 6.8 g binder, and 6.9 pigment to a 2 quart Vee Blender from Patterson-Kelly and heated to 160° F. for 30 minutes with tumbling and then cooled with tumbling for 30 minutes. The resultant product was uniformly coated with good adhesion. In a second series of experiments with these materials the coating was done with 36 g pigment. While the final product was more intense in color, the resulting coating uniformity and adhesion were the same.

Example 6

Sand obtained from the Ottawa plant of Unimin grades Minispheres 4900 and Granusil 4030 were coated with Polywax 500 in a 1 cubic foot Patterson-Kelly Vee Blender at 150° F. with tumbling for 2 hours and cooling for with tumbling for 1 hour. The resulting material was uniformly coated and tested for hydrophobicity by placing in water. No wetting was observed and the coating appeared to be stable after one week submersion. The samples were used in a water filtration system with good bacteria removal.

What is claimed is:

1. An improved segregation-resistant and dust-resistant metallurgical composition containing alloying powder bound to iron-based powder for making compacted parts, comprising:

(a) at least about 80 percent by weight of iron-based powder;

(b) at least one alloying powder; and (c) about 0.05 to about 2 percent by weight of a binding agent for adhering the alloying powder to the iron-based powder, wherein the binding agent comprises polyethylene having a weight average molecular weight below about 4000, epoxy, paraffin wax, cotton seed wax, solid hydrogenated vegetable oils, or combinations thereof.

2. The metallurgical composition of claim 1 wherein the binding agent comprises polyethylene having a weight average molecular weight of about 2000 or below.

3. The metallurgical composition of claim 1 wherein the binding agent comprises epoxy.

4. The metallurgical composition of claim 1 wherein the binding agent comprises paraffin wax.

5. The metallurgical composition of claim 1 wherein the binding agent comprises cotton seed wax.

6. The metallurgical composition of claim 1 wherein the binding agent comprises solid hydrogenated vegetable oils.

7. An improved segregation-resistant and dust-resistant metallurgical composition containing alloying powder bound to iron-based powder for making compacted parts, comprising:

(a) at least about 80 percent by weight of iron-based powder;

(b) at least one alloying powder; and (c) 0.25 to 2 percent by weight of a binding agent for adhering the alloying powder to the iron-based powder, wherein the binding agent comprises polyethylene, epoxy, paraffin wax, cotton seed wax, solid hydrogenated vegetable oils, or combinations thereof.

8. An improved segregation-resistant and dust-resistant metallurgical composition containing alloying powder bound to iron-based powder for making compacted parts, comprising:

(a) at least about 80 percent by weight of iron-based powder;

(b) at least one alloying powder; and (c) about 0.05 to about 2 percent by weight of a solid polyolefin binding agent for adhering the alloying powder to the iron-based powder, wherein the polyolefin binding agent has a weight average molecular weight of below 3,000.

* * * * *

UNITED STATES PATENT AND TRADEMARK OFFICE
CERTIFICATE OF CORRECTION

PATENT NO.    : 6,602,315 B2         Page 1 of 1
DATED         : August 5, 2003
INVENTOR(S)   : William Hendrickson and Sydney Luk It is certified that error appears in the above-identified patent and that said Letters Patent is hereby corrected as shown below:

<u>Column 1,</u>
Line 55, "4,1356,566" should read -- 4,135,566 --

<u>Column 16,</u>
Line 4, "0.25" should read -- 0.05 --

Signed and Sealed this

Fourteenth Day of October, 2003

JAMES E. ROGAN
*Director of the United States Patent and Trademark Office*